G. S. SAXTON.
Broiler.

No. 96,973. Patented Nov. 16, 1869.

Witnesses:
William W. Keethel
Robert Burns

Inventor:
Geo. S. Saxton

United States Patent Office.

GEORGE S. SAXTON, OF ST. LOUIS, MISSOURI, ASSIGNOR TO HIMSELF AND JOHN M. SAXTON, OF SAME PLACE.

Letters Patent No. 96,973, dated November 16, 1869.

BROILER.

The Schedule referred to in these Letters Patent and making part of the same.

*To all whom it may concern:*

Be it known that I, GEORGE S. SAXTON, of St. Louis, in the county of St. Louis, and State of Missouri, have made certain new and useful Improvements in Broilers; and I do hereby declare the following to be a full and true description thereof, reference being had to the accompanying drawings, and to the letters of reference marked thereon.

The object of this improvement is to form an improved broiling-pan generally, and especially to avoid loss of flavor and great uncleanliness, arising when meats are turned on the grating or wicker of ordinary broilers. The construction of this improved broiler is, moreover, such that the meat-juices are, to a great extent, prevented from falling upon the fire, thus also hereby avoiding unpleasant odors, and saving from loss said juices, which in many cases form acceptable sauces.

Figure 1:
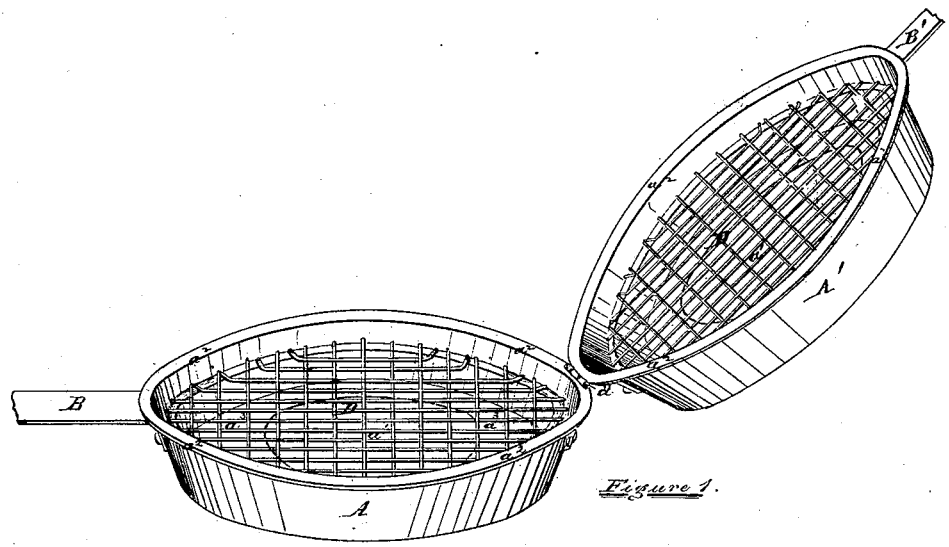
Figure 2:
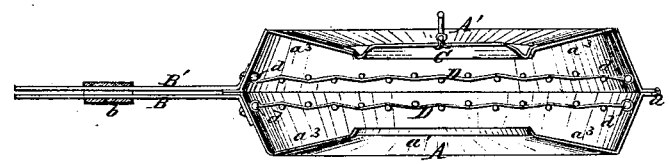
Figure 3:
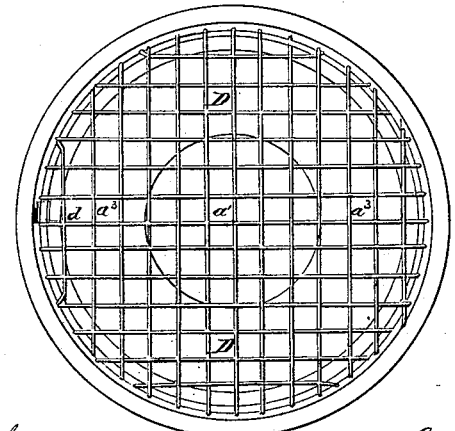

To enable others herein skilled to make and use my said improved broilers, I will now more fully describe the same, referring herein to the accompanying Figure 1 as a perspective view of my said broilers opened; to Figure 2 as a sectional elevation thereof when closed; and to Figure 3 as a plan of one-half of the broiler-casing and grating.

I form said broiler of two pans, A A', similar to each other in all respects, and connected by a hinge, at $a$.

Each pan has a handle, B B', respectively, and when the pans are closed, (over each other,) a ferrule, $b$, clasps upon the handles B B', to hold them together, and thus also secure the pans in their relative positions.

Each of said pans has a large bottom opening, $a^1$, the body of the pan having a raised edge, $a^2$, and an inclined bottom, $a^3$, so that when the pan is over a fire, the lower part A shall be in position to receive fluid juices on the bottom $a^3$.

When in use in broiling, a suitable cover, C, is placed over the bottom opening of the upper pan, as indicated in fig. 2.

To each pan I connect, by a suitable hinge-joint, $d$, a wire grating, D, the two grates thus used being placed at such distance from the edge of each pan, that when the broiler is closed, (as in fig. 2, shown,) there shall be room enough between the gratings for a slice of meat, bread, or other eatable, which is to be prepared.

The outer (circumferential) surfaces of the pans A A' will usually be somewhat conical, thus preventing the gratings from a departure from each other, greater than desirable.

In introducing the article of food, the pan is opened, as shown in fig. 1, the said article is placed upon the lower grating, and the lid and its grating brought to a close, and secured by the ferrule. Then the cover C is placed in position, and the broiler, with its contents, placed over hot coals, (or other heat-source,) in the usual manner.

When one side of the meat or other food is broiled, the entire broiler (by its double handle) is turned, the cover C having been temporarily removed, thus presenting the other surface to the heat.

The inclined bottom $a^3$ guides the heat and flame toward the opening $a^1$, so as to cause a quick broiling-action, while, at the same time, the meat-gravy or other juices to a great degree are caught up by the bottom ring-surface $a^3$, (being retained by the edge $a^2$,) and if the broiler is turned with ordinary care, these juices will not be wasted in turning.

By the improved construction of my said broiling-device, the heat is not only directed toward the point desired, but the essential parts of the eatable are preserved to a great extent, and a cleanly and inoffensive use of the device is made possible, with less care than usually required with similar devices.

Having thus fully described my invention,

What I claim, is—

1. A device for broiling and similar purposes, formed of two parts, A and A', hinged together, and secured at their handles by a ferrule, or in other convenient manner, when each of said parts has an open bottom, and is arranged with an inner grating, substantially as set forth.

2. The parts A and A', arranged with inclined annular bottoms $a^3$, having raised edges $a^2$, and used either with or without a cover, C, substantially as and for the purposes set forth.

GEO. S. SAXTON.

Witnesses:
WILLIAM W. HERTHEL,
GEO. S. SAXTON.